(12) United States Patent
Juranitch

(10) Patent No.: US 6,349,476 B1
(45) Date of Patent: Feb. 26, 2002

(54) CHICKEN-TENDER-SCORING KNIFE ASSEMBLY

(76) Inventor: John R. Juranitch, P.O. Box 150, Ely, MN (US) 55731

( * ) Notice: Subject to any disclaimer, the term of this patent is extended or adjusted under 35 U.S.C. 154(b) by 0 days.

(21) Appl. No.: 09/589,056

(22) Filed: Jun. 7, 2000

(51) Int. Cl.$^7$ .................................................. B26B 1/00
(52) U.S. Cl. .............................. 30/304; 30/287; 30/320
(58) Field of Search ............................ 30/113.3, 123.7, 30/279.2, 280, 287, 299, 304, 312, 320, 283; 452/137, 161

(56) References Cited

U.S. PATENT DOCUMENTS

| | | |
|---|---|---|
| 379,286 A | 3/1888 | Runnels |
| 595,597 A | * 12/1897 | Blanchard .................... 30/304 |
| 655,301 A | 8/1900 | Hamilton |
| 761,867 A | 5/1904 | Fish |
| 1,081,840 A | 12/1913 | Koehl et al. |
| 1,226,797 A | 5/1917 | Newman |
| 1,360,765 A | 11/1920 | Knowlton |
| 1,847,062 A | 2/1932 | Lemmon, Jr. |
| 2,034,490 A | 3/1936 | Schnack |
| 2,051,680 A | 8/1936 | Collens |
| 2,142,197 A | 1/1939 | Lee |
| 2,397,875 A | 4/1946 | Marshaus |
| 2,528,166 A | 10/1950 | Orr et al. |
| 2,793,392 A | 5/1957 | Cutrera |
| 3,270,368 A | 9/1966 | Cook, Sr. et al. |
| 3,452,754 A | 7/1969 | Stayer |
| 4,472,879 A | 9/1984 | Sizemore, Jr. |
| 4,574,431 A | 3/1986 | Colling |
| 5,680,705 A | * 10/1997 | Josoha ........................ 30/304 |

* cited by examiner

Primary Examiner—Hwei-Siu Payer
(74) Attorney, Agent, or Firm—Schroeder & Siegfried, P.A.

(57) ABSTRACT

A self-adjusting knife assembly for scoring tenders from chickens, the assembly having a pair of generally parallel handle halves in spaced relation and positively connected by a connector pin, to permit a pair of generally parallel knives, which are mounted on the forward ends of the handle halves, to move toward and away from each other. The connector pin is mounted so that the two handle halves are positively connected to permit relative rocking movement therebetween about a transverse axis disposed in a vertical plane, to thereby permit the pair of knives to self-adjust and follow the opposite sides of the keel bone of the chicken throughout its length, and thereby separate the tenders cleanly from that bone. Spring extends between the forward portions of the two handle halves and constantly gently urges the knives apart. The knives follow the contour of the keel bone, despite its irregularities of shape, as the knives are moved downwardly throughout the length of the keel bone. The normal grip of the scorer urges the knives gently toward each other, as the result of slight downward pressure upon the off-set thumb rest which maintains the knives in contact with the keel bone at each of its sides.

25 Claims, 7 Drawing Sheets

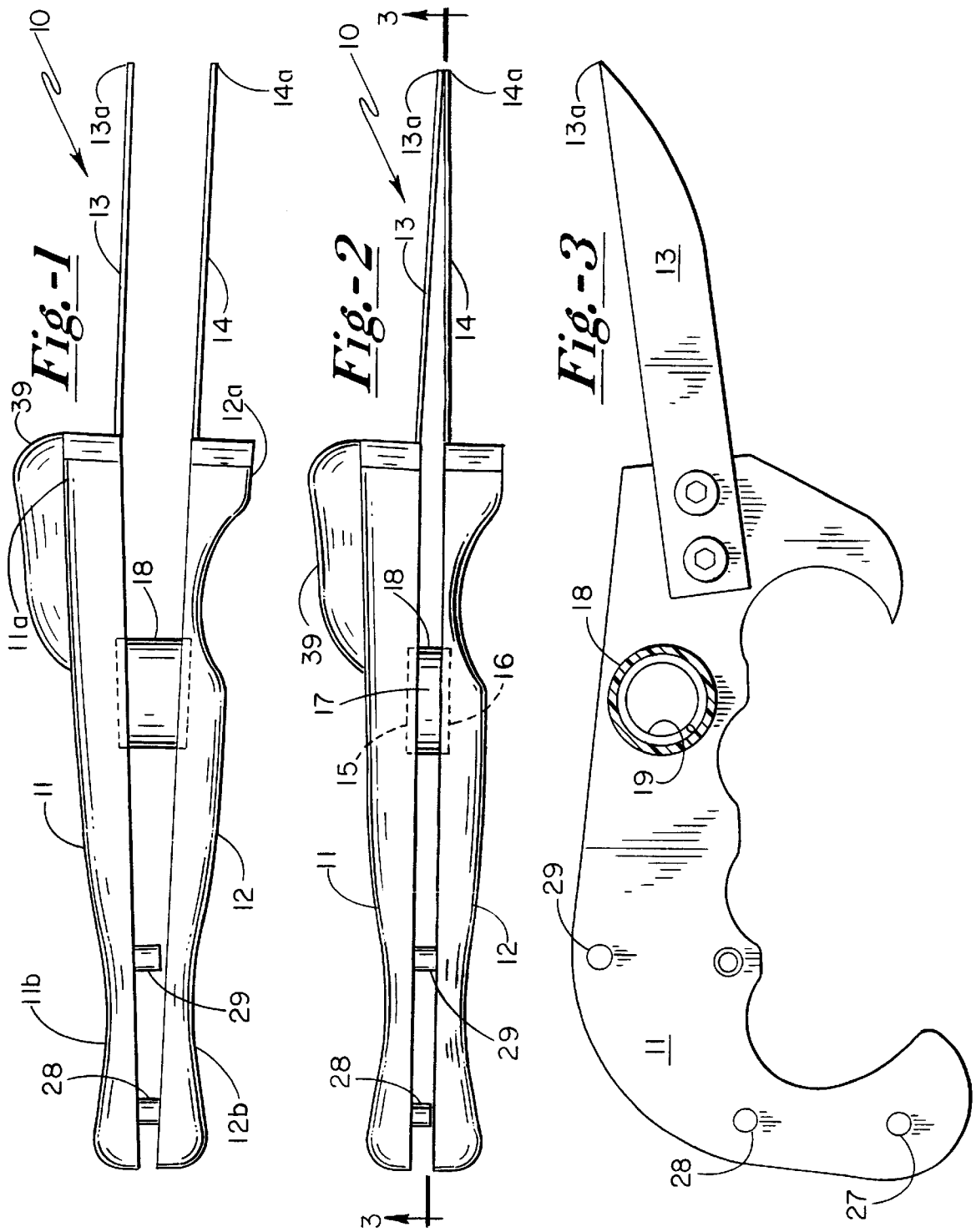

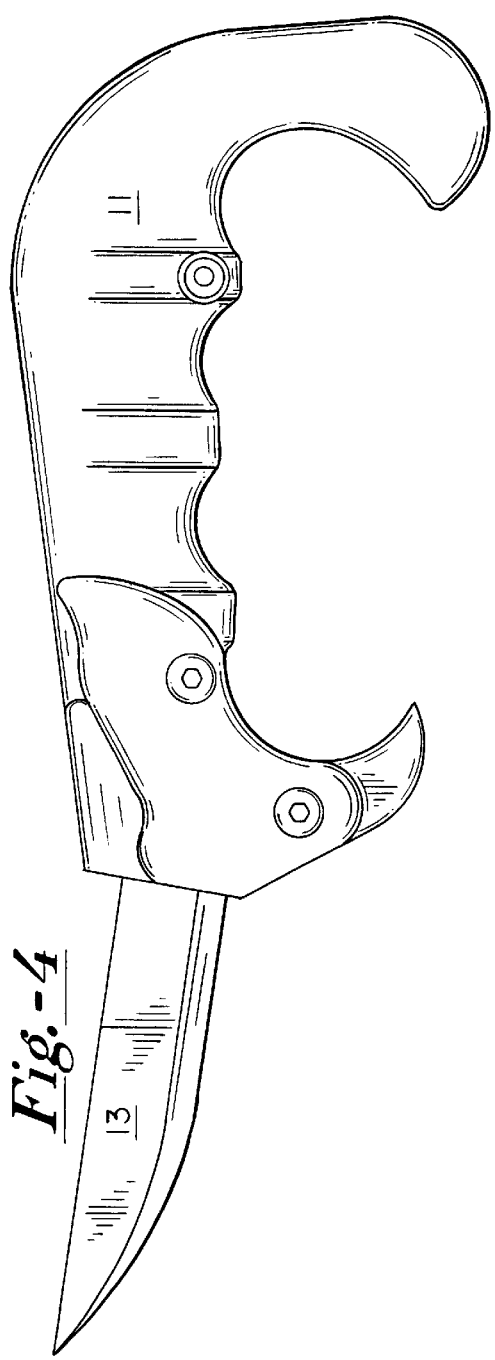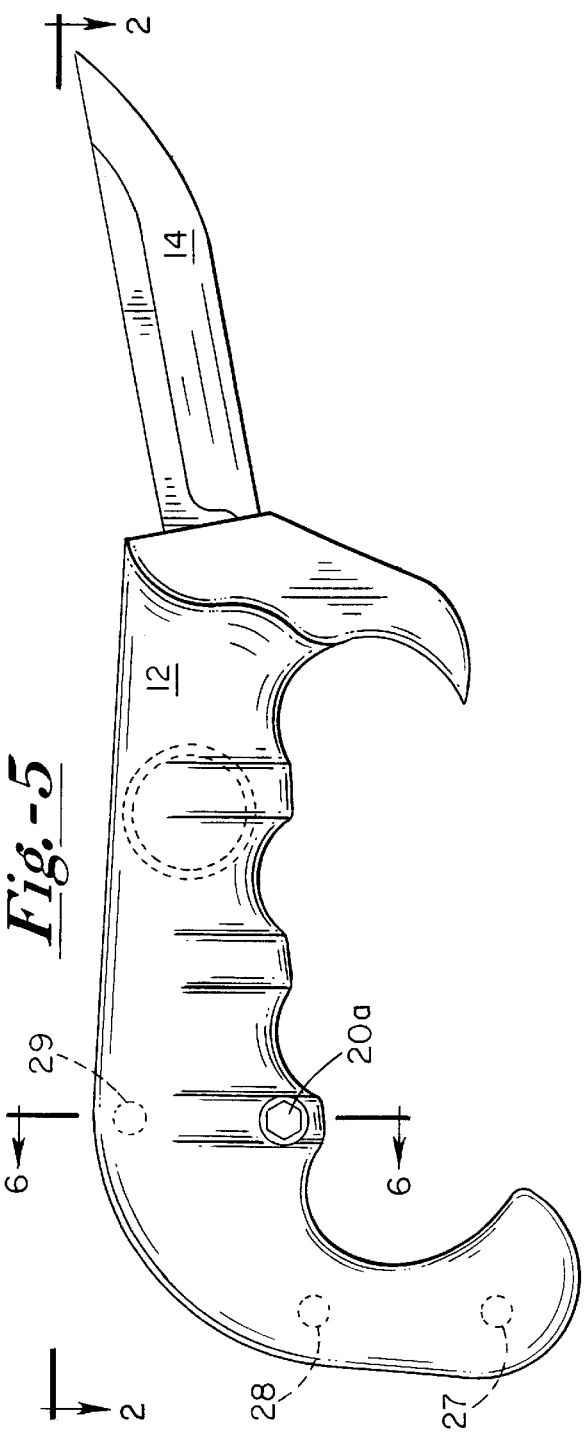

CHICKEN-TENDER-SCORING KNIFE ASSEMBLY

BACKGROUND OF THE INVENTION

In recent years, chicken raising has become highly refined. In addition, chicken meat has become highly popular because of its lack of fat, and its reduced cost because of economies developed in the raising of chickens. As a consequence, it has become highly common and profitable to prepare, package, and sell chicken. Because of its popularity as a food and its lack of fat, a high market has developed for chicken breasts, alone.

Since the market demands that the tenders be packaged alone, without other less desirable portions, a relatively high price can be obtained for this product. Diet-conscious customers are willing to pay a premium for such meat when so packaged, and thus the two tenders are the most valuable portion of the chicken. Because thereof, it is important that the tenders be scored as inexpensively and efficiently as possible, since they are in demand, and that all waste of that product be avoided.

The chicken has a bone or cartilage which extends downwardly and rearwardly beneath the breast and is known as the keel bone. The breast extends as two halves along opposite sides of the keel bone; one half on either side of the bone. Immediately behind each half of the breast, on each side of the keel bone, lies a tender. It has been found that, if access is made at the top or front end of the breast, and a knife is drawn downwardly at each side of the keel bone, the tenders can be quickly pulled downwardly and free. Such actions, however, frequently result in an objectionable loss of substantial portions of the tenders, unless deliberate care is taken to insure that the knife follows the contour of the keel bone very closely. To do so has heretofore consumed a prohibitive amount of time. With my knife assembly, I have found a way of quickly and easily following the contour of the keel bone, so as to sever the membrane connecting the tenders to the keel bone. Since the knives automatically adjust so as to follow the contour of the keel bone, there is substantially no loss of the meat and a minimum of effort is required.

To gain access to the tenders, the skin is opened with a knife at the point where the wings are jointed to the remainder of the chicken and the joints are severed. The skin is then pulled downwardly sufficiently far to expose the thighs. In doing so, the breast halves move downwardly with the skin, thereby exposing the keel of the keel bone, and the tenders lying alongside same.

Certain breeds of chicken have keel bones of more prevalent width than others. Most keel bones, at the upper or forward end, are about ⅛ of an inch in width. Some keel bones, however, widen abruptly and extensively at a point about one fourth of the way towards its rear or lower end, and after extending downwardly a short distance with a similar width, will narrow again to a considerably more narrow width. Such irregular keel bones normally cause considerable waste. My knife assembly is particularly valuable for scoring the tenders from keel bones of such varying shapes.

My invention is designed to cause each of my pair of knives to follow the contour of the keel bone, despite the fact that the keel bone varies in width and at one point, at least, increases in width substantially for at least a short distance vertically. My new knife assembly is designed to cause the knives to initially move across the outer surface of the keel bone, and thereafter rapidly follow the side edges of the keel bone, thereby meeting the need for speed in completing the scoring operation. The knives move along, and follow, the above marked variances in the width of the keel bone, as the knives progress downwardly on opposite sides of the keel. As a consequence, the two tenders are cleanly severed from practically all connections to the keel bone, to thereby enable the scorer to quickly and easily complete that portion of the butchering operation of the chicken without any substantial loss of portions of the tenders.

The upper end of the keel bone of the chicken is located adjacent the point at which the neck joins the main body of the chicken, and just below and behind the wishbone or pulley bone, as referred to in the art. At that point there is a membrane which covers the tenders and holds them in place along the keel bone and behind the two breast halves. This membrane must be pierced so as to gain access to the area immediately above and behind the two tenders, so that the scorer can readily remove the two tenders by inserting his thumb and fore-finger above and behind the tenders, and exerting a downward pull thereupon. The two tenders will thereupon readily come entirely free of the keel bone, and become available for packaging. The forward points of my knives are spaced about three-sixteenths of an inch, so as to facilitate piercing that membrane at the proper locations. The rearmost portions of my knives are spaced about one-quarter of an inch.

BRIEF SUMMARY OF THE INVENTION

My chicken tender scoring knife assembly is characterized by a pair of separate half-handle elements, each of which has a forward end portion upon which a knife member is mounted. Each knife member extends substantially parallel to its opposite knife member and its point terminates opposite that of the other knife. The two knife half-handle elements extend substantially parallel to and are spaced from each other, about three-sixteenths to one-quarter of an inch. A yieldable biasing means in the form of a spring member extends between the forward end portions of the two half-handle elements and maintains them and their supported knives in spaced, substantial parallel relation.

Adjacent the rear end portions of the half-handle elements is a connector means in the form of a threaded pin having a head, which is mounted with a sloppy fit in the right-hand half-handle. This pin extends across, to and through the left-hand half-handle to which it is fixedly secured by a nut. A plastic bushing surrounds the portion of the pin which extends within the right-hand half-handle with a slight amount of spacing therebetween, to provide a loose fit which permits the half-handle element having the sloppy or loose fit to rock about a transverse vertical axis. This rocking action permits the forward portions of the two half-handles, and the knives mounted thereon, to move toward and away from each other within restricted limits, and enables the scorer to draw the knives downwardly along both sides of the keel bone, to thereby cut the tenders free at their point of juncture with that bone. This greatly reduces the waste and loss of valuable meat and greatly facilitates the tender-scoring operation. Several alignment blocks are mounted on the inside surface of one of the half-handles, at its rear end portion, to aid in maintaining the two knives in alignment during the rocking action, as they are moved by the scorer in the tender-scoring action described above.

Thus, it is clear that a primary object of my invention is to provide a self-adjusting chicken tender-scoring knife assembly which will function most efficiently in effecting a tender-scoring operation, in less time and with a minimum of effort, while minimizing the loss of portions of the most valuable sections of the chicken.

Another object is to minimize the amount of time required to score the chicken tenders during a scoring operation of the chicken.

A further object is to provide a chicken-scoring tool which is inexpensive and yet highly effective in minimizing loss of valuable portions of the tenders of the chicken, and at the same time reducing the amount of time required to complete the removal of the tenders from the remainder of the body of the chicken.

These and other objects and advantages of the invention will more fully appear from the following description, made in connection with the accompanying drawings, wherein like reference characters refer to the same or similar parts throughout the several views, and in which:

BRIEF DESCRIPTION OF THE DRAWINGS

FIG. 1 is a top plan view of one of my chicken tender-scoring knife assemblies in open position;

FIG. 2 is a top plan view thereof, in closed position;

FIG. 3 is a vertical sectional view, taken along line 3—3 of FIG. 2, and showing the inner surface of the left-hand half-handle in elevation;

FIG. 4 is a left side elevational view thereof;

FIG. 5 is a right side elevational view thereof;

DETAILED DESCRIPTION OF THE INVENTION

Figure 6:
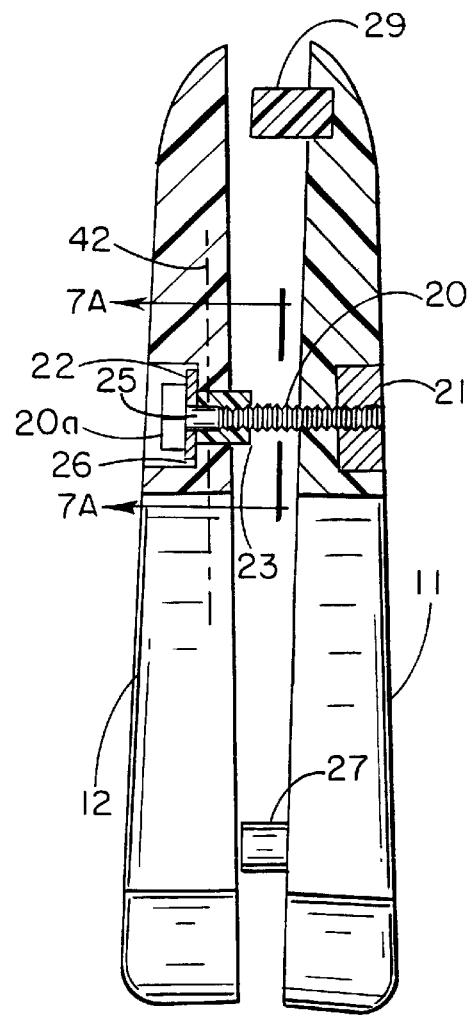
FIG. 6 is a vertical sectional view, taken along line 6—6 of FIG. 5.

My self-adjusting chicken tender-scoring knife assembly is constructed to facilitate the removal of the two tenders of a chicken, with a minimum of effort and loss of product, while minimizing the amount of time required to complete the separation of the tenders from the keel bone and the remainder of the body of the chicken.

As shown in the drawings, my tender-scoring knife assembly 10 includes the use of a pair of elongated, transversely spaced half-handle elements 11 and 12 which are discrete and extend in spaced substantially parallel relation. Each of these elements 11 and 12 has a knife such as those identified by reference numerals 13 and 14, respectively, which are carried by the forward end portions 11a and 12a of the two half-handle elements and are supported in substantially parallel-extending relation. The two knives 13 and 14, as well as the half-handle elements 11 and 12, are spaced transversely from each other and the forward end portions of the knives terminate directly opposite each other as shown in FIGS. 1 and 2.

Each of the half-handle elements 11 and 12 have a cylindrical recess 15 and 16, respectively, disposed opposite each other to cooperatively define a cylindrical opening 17, within which a plastic tube 18 is disposed to extend transversely within the cylindrical opening 17, to house a coiled metal spring 19, which is also cylindrical in configuration. This spring 19 is under slight compression, but yieldable, so as to urge the two knives away from each other. The knives 13 and 14, when in open position, are disposed three-sixteenths of an inch away from each other at their points 13a and 14a.

The rear end portions 11b and 12b of the half-handle elements 11 and 12, respectively, are positively connected by connector means in the form of an externally threaded pin 20, as best shown in FIG. 6, which extends transversely through each of the half-handle elements. This connector pin 20 has a hexagon shaped head 20a at one end and an internally threaded nut 21 at its opposite end. A metal washer 22 and a plastic bushing 23 are carried by the head end of the pin 20 in a loose fit through an opening 26 in the right-hand half-handle element 12, which opening is slightly larger in diameter than the exterior diameter of the bushing 23, so as to provide a loose fit and permit pin 20 to rock slightly within said opening.

The hexagon-shaped nut 21 is fixedly mounted within the half-handle 11, in a recess of the same size and shape, provided for that purpose. Since the nut 21 is held immovably by the walls of the recess, it is possible to adjust the spacing between the two half-handle elements 11 and 12, adjacent their rear end portions, by turning the head 20a in a clockwise or counter-clockwise direction with a suitable wrench, or a pair of pliers. Such an adjustment causes the spacing between points 13a and 14a to vary accordingly, depending upon whether the pin 20 has a left-hand or right-hand thread, when the handle elements are not compressed by the hand of a scorer.

Mounted on the inner surface of the left-hand half-handle element 11 are three spacer blocks or abutments 27, 28, and 29. These abutments each extend to a point adjacent the inner surface of the opposite half-handle element 12, and are positioned so as to maintain the two half-handle elements 11 and 12 in directly opposite positions as half-handle element 12 rocks, so that their forward ends, and the knives, are moved toward each other, or are permitted to move away from each other, by compression or release of the half-handle elements.

It will be readily seen that the coiled spring member 19 functions as a biasing means which constantly urges the forward ends 11a and 12a of the half-handle elements, and the knives 13 and 14, outwardly and away from each other. The spacing, preferably three-sixteenths of an inch, of the points 13a and 14a of the knives is adjustable by adjusting the spacing of the rear end portions 12a and 12b of the half-handle elements. This can be done by tightening or loosing the connector pin 20 by turning the head 20a either clockwise or counter-clockwise as the need may be.

As indicated above, the rocking action of the half-handle element 12 takes place at the head end of the connector pin 20 within the loose fitting plastic bushing 23. It will be seen that this rocking action involves shifting of the right-hand half-handle element 12 about a vertical axis located within the right-hand half-handle element within which the loose-fitting plastic bushing 23 is disposed. This rocking action permits the points 13a and 14a to move toward or away from each other, as the need therefor may be. This need depends upon the width of the keel bone of the particular chicken from which the two tenders are being taken. The rocking action permits the knives 13 and 14 to follow the contour of the keel bone 24, while adjusting to the variations in said keel bone widths, as the knives are moved downwardly and rearwardly therealong. Thus, it can be seen that the rocking action takes place about a transverse vertical axis 42 which extends substantially normal to the longitudinal axis of the half-handle element 12 and is disposed within the plane of that element, and that the loose fitting head end portion 25 acts as a fulcrum. It can also be readily seen that, if desired, the loose fitting of one end of the connector pin 20 could be installed in the opposite half-handle element, if desired.

Figure 7A:
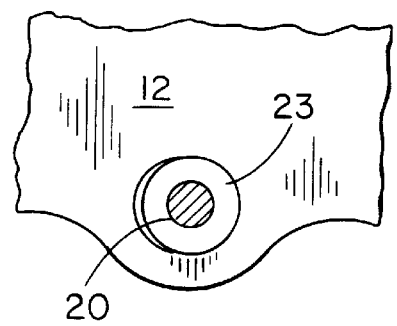
FIG. 7A is a fragmentary vertical sectional view, taken along line 7A—7A of FIG. 6, showing the deformation of the plastic bushing 23 caused by the spring 19 when the latter is not compressed by the scorer.
Figure 7B:
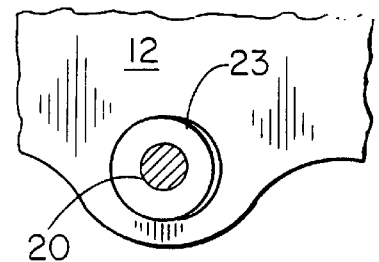
FIG. 7B is a fragmentary vertical sectional view taken along line 7A—7A, showing the deformation of the plastic bushing 23 caused by the movement of the two half-handles toward each other by the hand of the scorer.
Figure 8:
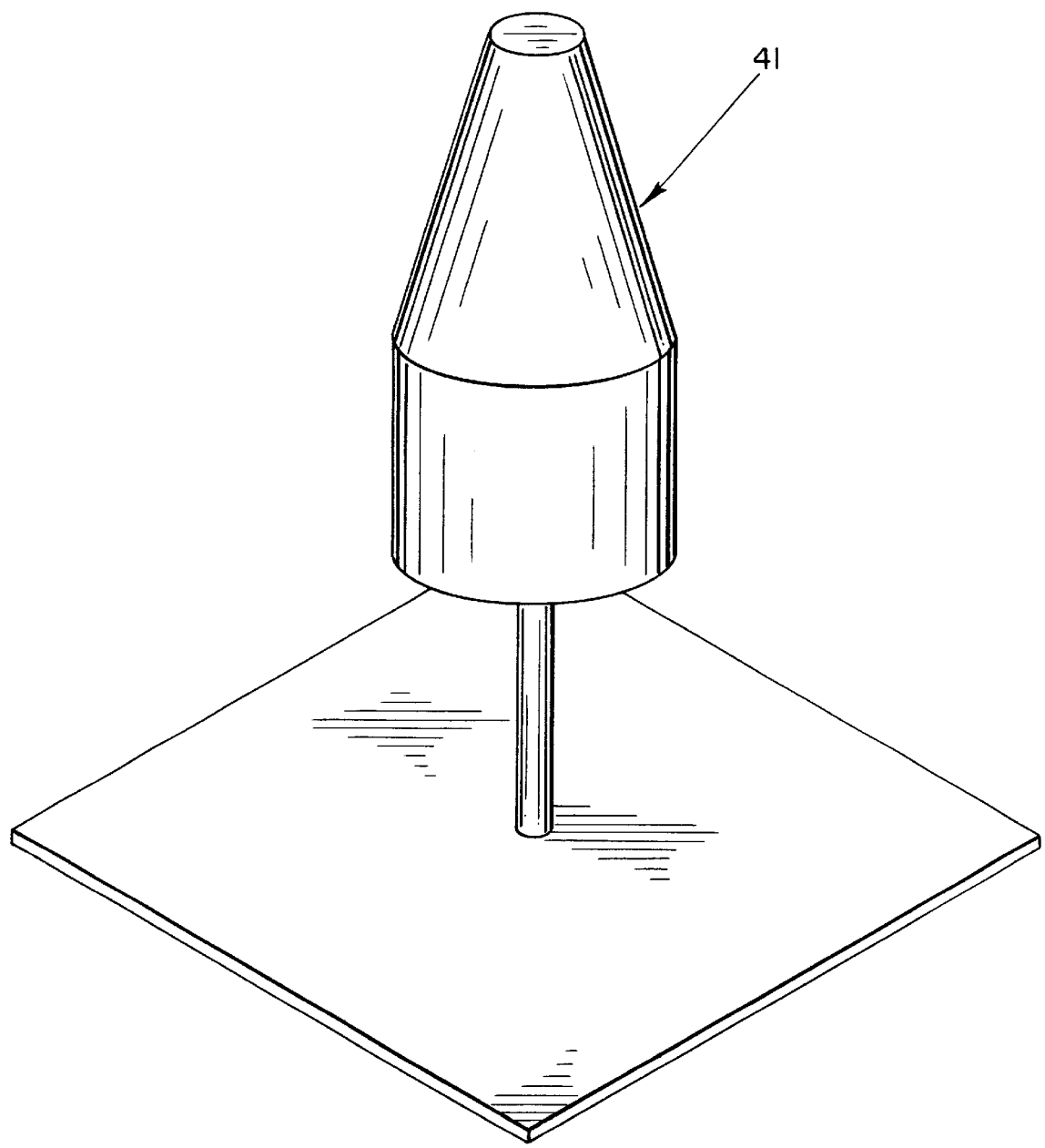
FIG. 8 is a perspective view of the chicken-mounting fixture used in the scoring operation.

While the above half-handle elements 11 and 12 are free of any transverse compression, such as is applied by the scorer while the knives are traversing the narrower portions of the keel bone 24, the forward points of the knives 13 and 14 are spaced as widely as permitted by the connector pin 20 and the extent to which the head 20a has been turned clockwise to the right. Without any compression against the biasing action of the spring 19, and in response to said biasing action, the head end portion 25 of the connector pin 20 will rock, and the pin will compress and deform the plastic bushing 23 which is flexible and resilient, so that it takes a form such as shown in FIG. 7A. However, when a narrower area of the keel bone 24 is encountered by the knives, the slight compression applied by the hand of the scorer in order to keep the knives in contact with the sides of the keel bone, will cause the knives 13 and 14 to move toward each other, and a vertical sectional view of the pin 20 and the plastic bushing 23 will appear as shown in FIG. 7B, and the knives 13 and 14 will have moved toward each other, and will follow the contour of the keel bone. If the keel bone 24 widens, the knives 13 and 14 will follow, and will move outwardly. This will cut loose substantially all of the flesh of the tenders from the keel bone 24 as the knives are drawn downwardly. Thus, the so described knife assembly, as a result of the rocking action of its discrete handle elements and knives, is self-adjusting throughout the removal of the two tenders from the remainder of the body of the chicken.

Figure 9:
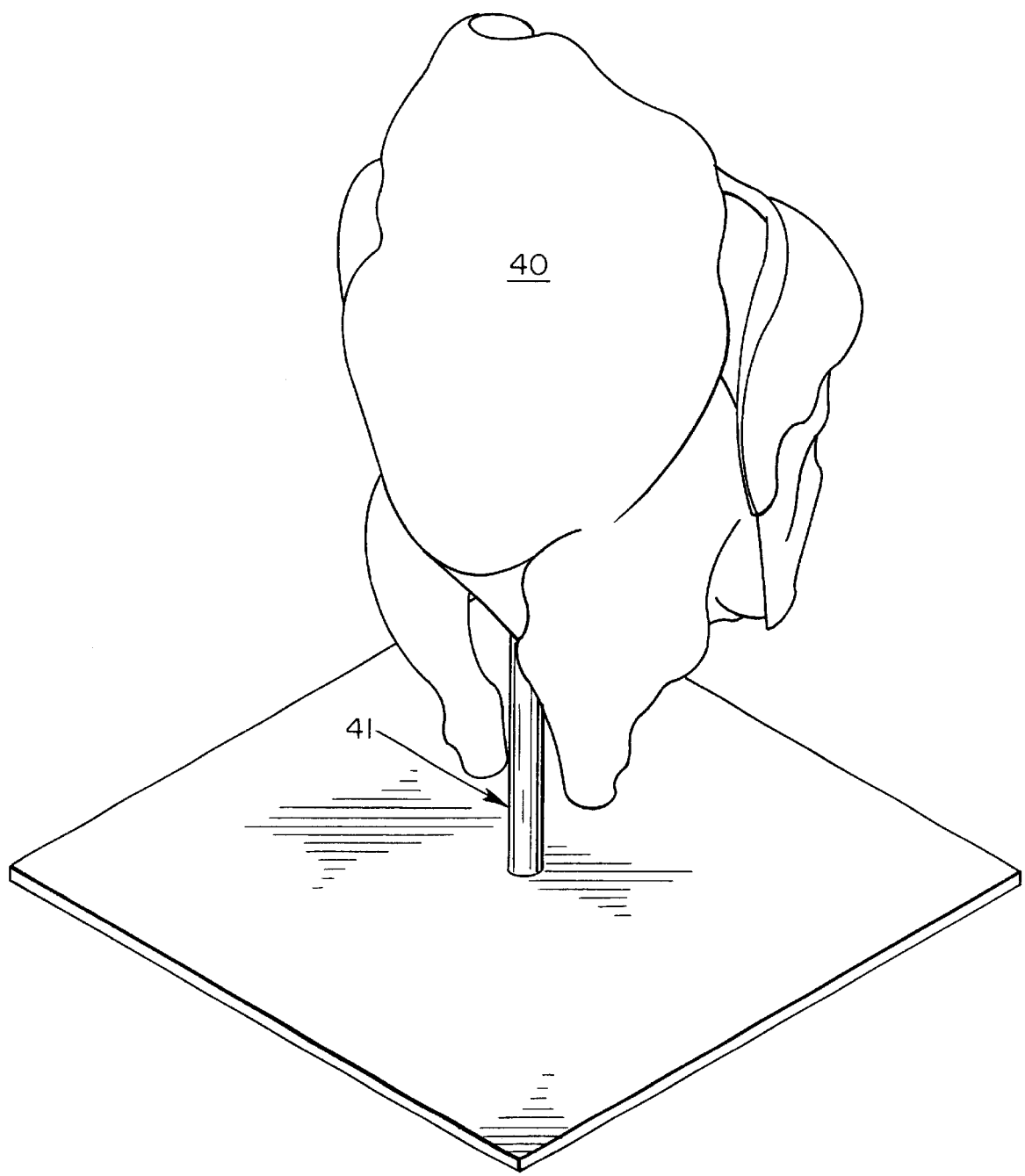
FIG. 9 is an elevational view of a chicken mounted upon the fixture shown in FIG. 8, preparatory to pulling the skin off the chicken to gain access to the keel bone.

The scoring operation of the chicken includes the positioning of the chicken upon the bullet-shaped mounting fixture 41 shown in FIG. 9.

Figure 10:
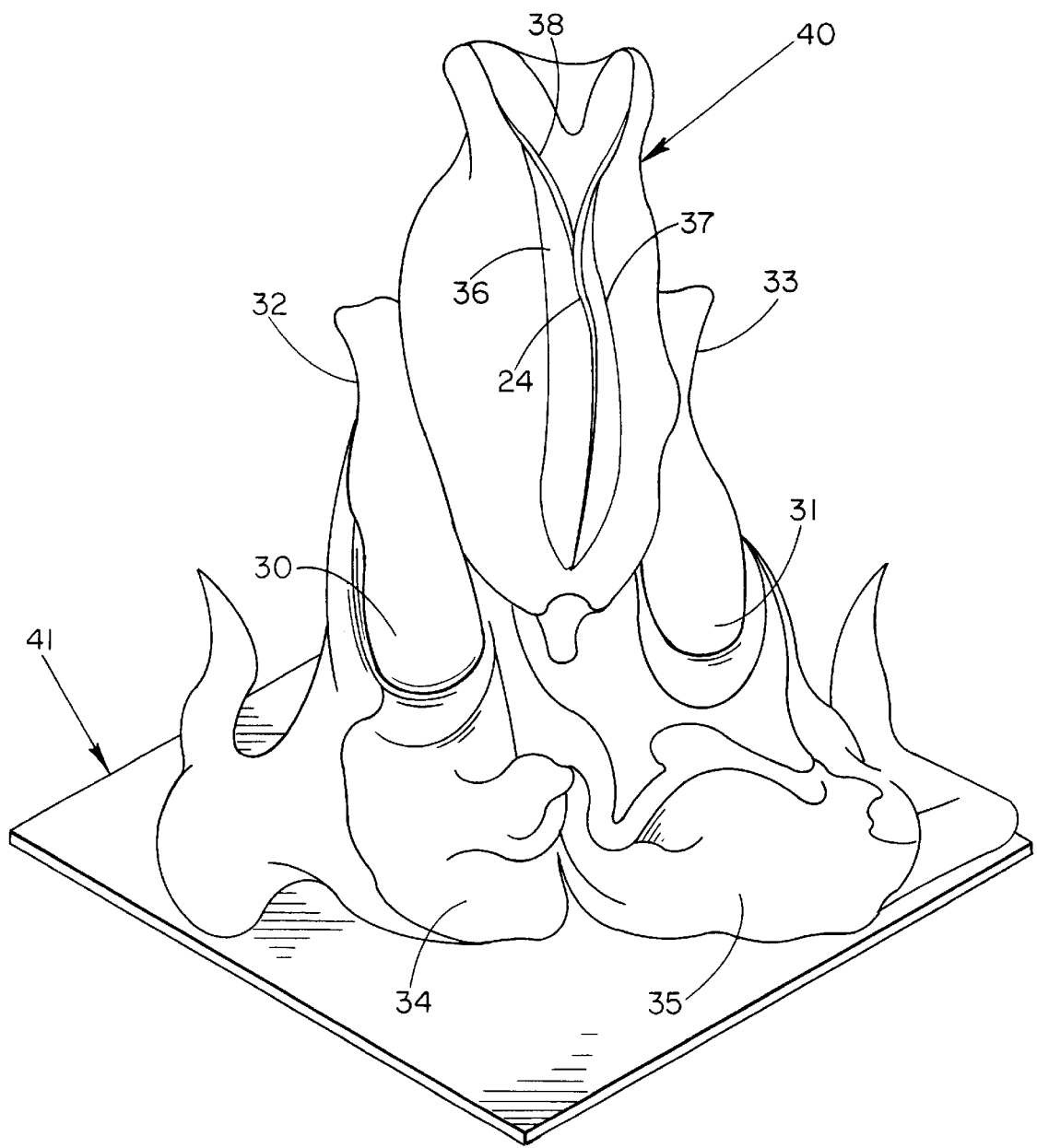
FIG. 10 is an elevational view of the chicken, after the skin has been pulled down to expose the keel bone and the tenders.
Figure 11:
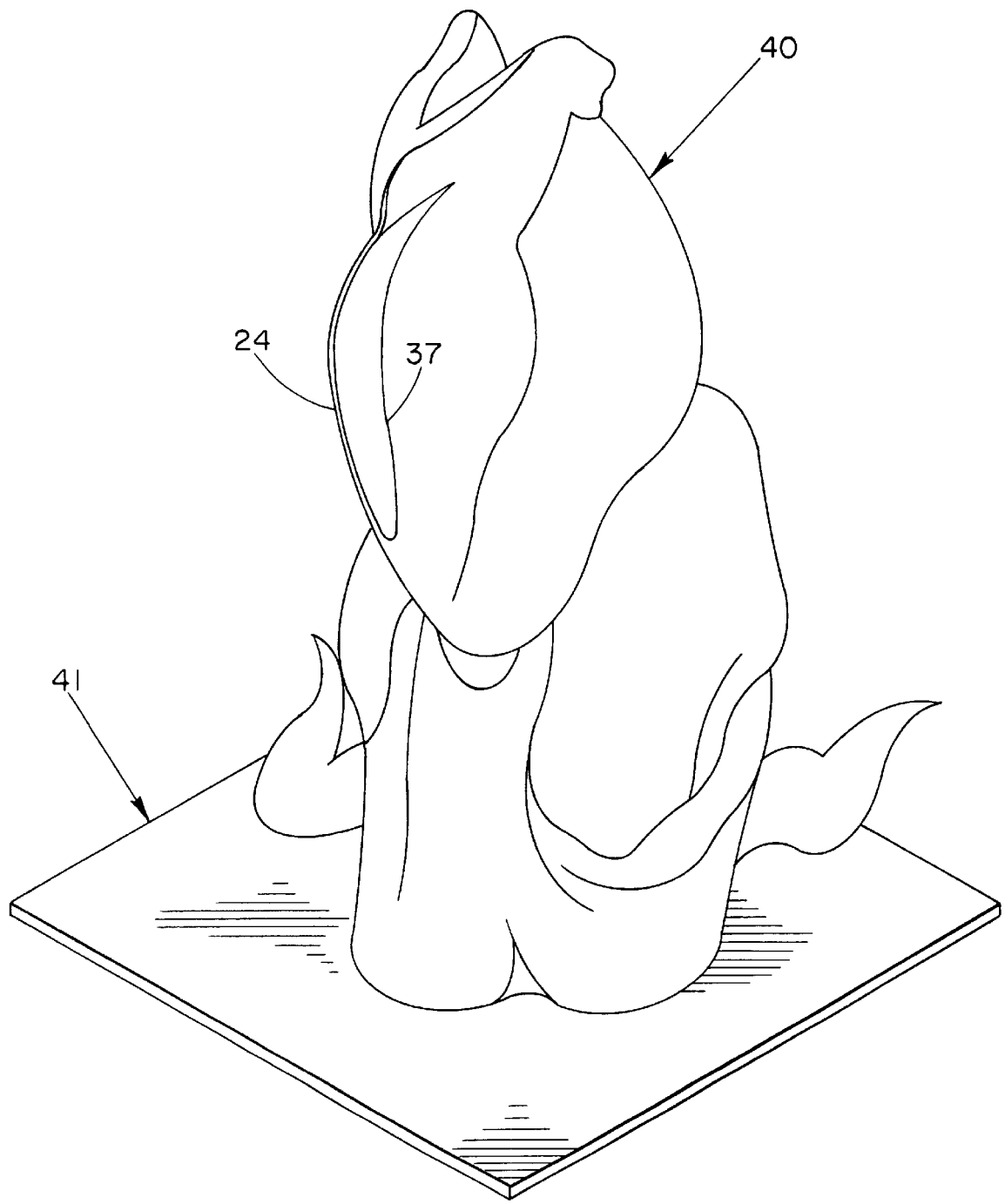
FIG. 11 is a side elevational view of the keel bone and the tender extending along the left side of that bone.

As shown in FIG. 10, the chicken carcass 40, which has been previously eviscerated, is placed from above upon the fixture 41, which extends upwardly into the cavity of the carcass. Entrance is thereafter made with a sharp knife through the skin and into the joint of each of the wings at the point of juncture with the main body of the chicken, which enables the scorer to draw the entire skin downwardly to expose the keel bone 24 and the thighs 30, 31 of each leg 32, 33, as shown in FIG. 10. In so doing, the two breast halves 34 and 35 are drawn away from the keel bone 24, and the two tenders 36 and 37 are exposed at opposite sides of the keel bone 24, as is shown in FIG. 10. FIG. 11 shows the keel bone 24 and one, 37, of the tenders more closely.

The scorer then inserts the points 13a and 14a at a location immediately below the pulley bone 38, and above the keel bone 24, to pierce the membrane thereabove, which enables the scorer, with his free hand, to insert his thumb and fore-finger of his free hand above and behind the two tenders 36 and 37, while following the two knives 13 and 14 as they are moved inwardly to the edges of the keel bone 24, and thereafter brought downwardly along opposite sides of the keel bone. This knife movement substantially severs both of the tenders from that bone.

The thumb rest 39, which extends laterally from the left side of the left-hand handle element 11 creates a slight off-center and hence, inward pressure upon the forward end portion of the half-handle element 11 when the thumb of the scorer is applied thereto, and thereby obviates the need for the scorer to apply substantial transverse pressure with his gripping hand. This off-center pressure which is applied at one side of the knife 13 through the thumb rest 39 tends to cause the knives 13, 14 to tilt about the longitudinal axis of the assembly 10. The scorer using the knife assembly unconsciously senses this tendency and closes his grip slightly and unconsciously in order to preclude such tilting. The effect of this slight closure of the scorer's grip is to maintain a slight pressure on the knives 13, 14 to move the knifes 13, 14 toward each other, and thereby follow the keel bone 24 at all times. By following this above procedure, the scorer succeeds in removing both tenders 36 and 37 quickly and effectively, with a minimum loss of the valuable flesh of the tenders. The relative shifting or rocking action between the two sets of half-handles and knives described hereinabove greatly improves the tender-scoring procedure and effects a substantial saving of the product.

It will, of course, be understood that various changes may be made in the form, details, arrangement and proportions of the parts without departing from the scope of the invention which comprises the matter shown and described herein and set forth in the appended claims.

What is claimed is:

1. A self-adjusting chicken tender-scoring knife assembly comprising:

(1) a pair of discrete handle elements extending alongside each other in transversely spaced, generally parallel relation, and having forward end portions;

(2) a pair of generally parallel knife members, each of which is mounted upon and extends forwardly in side by side relation from the forward end portion of one of said handle elements;

(3) connector means extending between and positively connecting said handle elements for free relative rocking motion therebetween about a transverse axis; and (4) yieldable biasing means constantly urging said forward end portions and said knife members away from each other in a transverse direction.

2. The knife assembly defined in claim 1, wherein said biasing means is disposed forwardly of said connector means.

3. The knife assembly defined in claim 1, wherein said biasing means comprises a spring member extending transversely of said handle elements.

4. The knife assembly defined in claim 1, wherein said connector means functions as a fulcrum for one of said handle elements.

5. The knife assembly defined in claim 1, wherein said connector means extends through at least one of said handle elements.

6. The knife assembly defined in claim 1, wherein said connector means extends into each of said handle elements.

7. The knife assembly defined in claim 1, wherein said connector means is adjacent rearward end portions of said handle elements.

8. The knife assembly defined in claim 1, wherein said connector means extends through one of said handle elements and into the other of said handle elements.

9. The knife assembly defined in claim 1, wherein said handle elements have rearward end portions, and spacer means disposed between said rearward end portions to maintain proper alignment of said handle elements as said members rock relative to each other.

10. The knife assembly defined in claim 1, wherein said transverse axis extends generally vertically.

11. The knife assembly defined in claim 1, further comprising a thumb rest carried by said forward end portion of one of said handle elements and extending laterally outwardly relative thereto to facilitate urging of said knife members toward each other.

12. A self-adjusting chicken tender-scoring knife assembly comprising:
   (1) a pair of discrete handle elements extending alongside each other in transversely spaced relation and having forward end portions;
   (2) a pair of generally parallel knife members, each of which is mounted upon and extends forwardly in side by side relation from the forward end portion of one of said handle elements;
   (3) transversely extending connector means shiftably and positively connecting said handle elements to each other to permit said handle elements and said knife members to shift toward and away from each other within restricted limits; and
   (4) yieldable biasing means constantly urging said handle elements and said knife members away from each other in a transverse direction.

13. The knife assembly defined in claim 12, wherein said biasing means comprises a spring member extending transversely between said handle elements.

14. The knife assembly defined in claim 12, wherein said connector means functions as a fulcrum for one of said handle elements.

15. The knife assembly defined in claim 12, wherein said connector means extends into at least one of said handle elements.

16. The knife assembly defined in claim 12, wherein said handle elements have rearward end portions, and spacer means extending between said rearward end portions and maintaining proper alignment of said handle elements as said members shift relative to each other.

17. The knife assembly defined in claim 12, wherein said shifting motion is a rocking motion about an axis extending transversely of said knife members.

18. A self-adjusting chicken tender-scoring knife assembly comprising:
   (1) a pair of discrete handle elements extending alongside each other in transversely spaced relation and each having forward end portions;
   (2) a pair of generally parallel knife members, each of which is mounted upon and extends forwardly in side by side relation from the forward end portion of a respective one of said handle elements and each having a forward end;
   (3) connector means extending transversely between and positively connecting said handle elements for free rocking motion therebetween about a transverse axis, to enable said knife members to freely move toward and away from each other; and
   (4) means extending between said knife members for normally maintaining a space of predetermined extent between the forward ends of said knife members.

19. The knife assembly defined in claim 18, wherein said space-maintaining means is a yieldable biasing means extending between said handle elements.

20. The knife assembly defined in claim 18, wherein said connector means is fixedly mounted on one of said handle element and is connected to the other of said handle elements with a loose fit to permit a rocking motion of said other handle element about an axis extending transversely of said handle elements.

21. A self-adjusting chicken tender-scoring knife assembly comprising:
   (1) a pair of discrete handle elements extending alongside each other in transversely spaced relation and having forward end portions;
   (2) a pair of generally parallel knife members, each of which is mounted upon and extends forwardly in side by side relation from the forward end portion of a respective one of said handle elements and each having a forward end;
   (3) connector means extending transversely between and positively connecting said handle elements for free rocking motion about an axis extending transversely of said handle elements to permit said knife members to be moved toward and away from each other; and
   (4) spacer means for normally maintaining a space of predetermined extent between the forward ends of said knife members.

22. The knife assembly defined in claim 21, wherein said transverse axis of said free rocking motion is disposed within the plane of one of said handle elements.

23. The knife assembly defined in claim 21, wherein said connector means has a pair of opposite ends, each of which is anchored by one of said handle elements.

24. The knife assembly defined in claim 21, wherein said connector means has opposite end portions, one end portion of which is fixedly connected to one of said handle elements, and the other end portion of which is connected to the other of said handle elements with a loose-fitting connection which permits said handle elements to rock relative to each other about a vertical axis, which permits said forward ends of said knife members to move toward and away from each other.

25. The knife assembly defined in claim 21, wherein said spacer means includes:
   resilient means extending between said handle elements and constantly urging said handle elements away from each other.

* * * * *

UNITED STATES PATENT AND TRADEMARK OFFICE
CERTIFICATE OF CORRECTION

PATENT NO. : 6,349,476 B1
DATED : February 26, 2002
INVENTOR(S) : John R. Juranitch It is certified that error appears in the above-identified patent and that said Letters Patent is hereby corrected as shown below:

<u>Title page,</u>
Item [57], ABSTRACT,
Line 13, insert -- means -- immediately after "Spring".

Signed and Sealed this

Ninth Day of July, 2002

*Attest:*

JAMES E. ROGAN
*Attesting Officer*  *Director of the United States Patent and Trademark Office*